United States Patent [19]

Landa et al.

[11] 4,148,086
[45] Apr. 3, 1979

[54] DEVICE FOR OVERLOAD PROTECTION OF ELECTRIC APPARATUS

[76] Inventors: Mikhail L. Landa, ulitsa Entuziastov, 45, kv. 38; Vladimir Y. Sinelnikov, Pechersky spusk, 13, kv. 24; Rostislav F. Stasenko, ulitsa Tatarskaya, 36/5, kv. 20; Igor M. Shishkov, ulitsa Tatarskaya, 36/5, kv. 57, all of Kiev, U.S.S.R.

[21] Appl. No.: 804,357

[22] Filed: Jun. 7, 1977

[51] Int. Cl.$^2$ .................... H01H 37/00; H02H 7/04
[52] U.S. Cl. ........................... 361/37; 73/350; 340/588; 340/646; 340/647
[58] Field of Search ............ 361/35, 36, 37, 83; 340/253 A, 227 R, 228 R; 73/350; 336/68, 192; 324/51; 335/17, 68

[56] References Cited

U.S. PATENT DOCUMENTS

| 2,704,841 | 3/1955 | Ryan | 361/37 |
| 3,683,362 | 8/1972 | Schwanenflugel | 340/253 A |
| 3,857,068 | 12/1974 | Braunstein | 361/37 |
| 3,883,781 | 5/1975 | Cotton | 335/17 |

*Primary Examiner*—Gerald Goldberg
*Attorney, Agent, or Firm*—Lackenbach, Lilling & Siegel

[57] ABSTRACT

The system for determining and indicating overload conditions of electrical apparatus immersed to a dielectric liquid contains a heat sensing element in the top portion of the dielectric liquid and a load current sensor. The output signal of the heat sensing element and the output signal of the load current sensor, corrected with due regard to the dependence of the temperature of the winding's hottest spot on the load current, are applied to a switching circuit. The switching circuit contains an alarm circuit and a tripping circuit controlled by low- and high-overload threshold elements selectively operating at successively increasing temperature values of the electrical apparatus' hottest spot. The tripping circuit comprises a device for suppling an alarm signal and/or for deenergizing the electrical apparatus upon completion of the safe service life of the electrical apparatus. There is also provided an interlocking circuit for retaining false switching off signals which is adapted to filter out high overload signals due to the load current, which are safe for the electrical apparatus. The system provides for tripping the electrical apparatus in case of injurious overloads.

8 Claims, 8 Drawing Figures

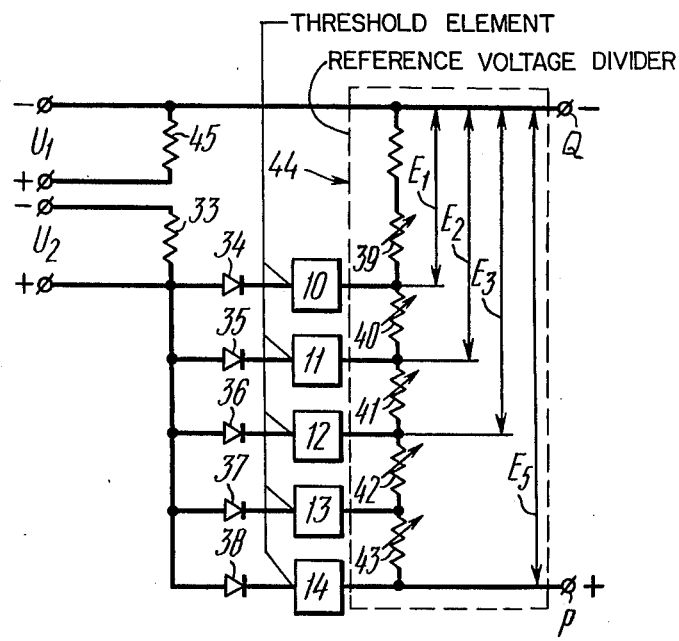
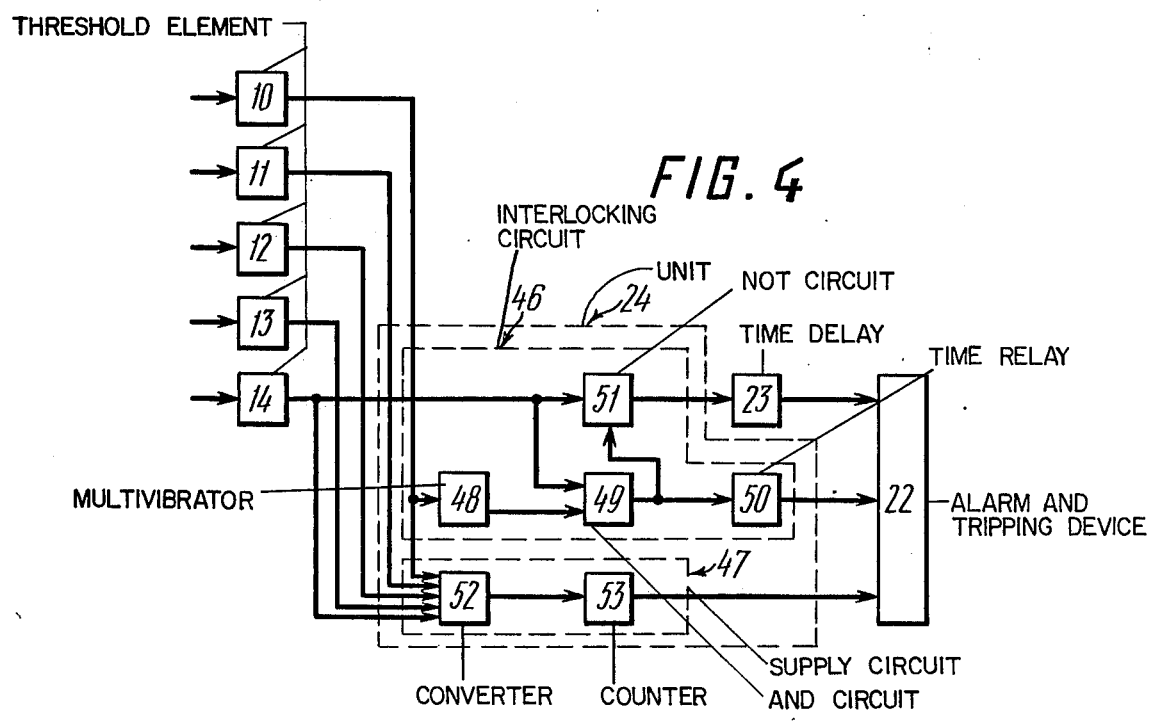

DEVICE FOR OVERLOAD PROTECTION OF ELECTRIC APPARATUS

FIELD OF THE INVENTION

The present invention relates to devices for overload protection of electric apparatus and may be utilized in devices for protection of electric induction apparatus, such as power transformers, and in systems of power supply to industrial, agricultural, municipal, transport, and other users.

An application of the present invention for overload protection of electric apparatus will be described below but it is not intended that the invention be limited to the described application thereof since it may be used in other objects, such as reactors filled with oil cables etc.

Internal heat losses in transformer under operation conditions increase as the load increases. If a transformer is overloaded in excess of a predetermined safe value, its internal temperature may rise above a permissible operation value causing damage to the insulation of the winding and breakdown of the transformers. The maximum permissible load of a transformer changes with the rate of dissipation of internal heat. Thus, if the outside air temperature is lower than the temperature of the transformer oil, or of some other cooling medium, the heat will dissipate quicker and, hence, the transformer will carry a higher load.

DESCRIPTION OF THE PRIOR ART

Known in the art are several types of devices for overload protection of electric induction apparatus, the said devices differing both in the protection method and design.

There is a protection system with a time delay independent of the load current. This system comprises a current starting element with a setting proportional to the nominal current of the apparatus to be protected. Since the change of current manifests only a change in the overheating of the winding with respect to oil temperature under steady-state conditions, an increase of load in excess of nominal amount does not reflect all the factors which effect the heating.

There are also devices incorporating heat-sensing elements built into the transformer windings or located in close proximity to the hottest spot of the winding. Since the power transformer windings are under high voltage the realisation of such devices involves great difficulties.

Also known is a protection device, disclosed in U.S. Pat. No. 2,704,841, comprising mechanically connected heat-sensing bimetallic elements immersed in a top portion of the transformer oil and inserted into the circuit with the transformer winding to indicate safe continuous overloads with a time delay and a much quicker response to high overloads of a short duration. Theoretically, a careful selection of the bimetallic strips with due regard to their thermal conductivity, surface area, and thermal losses may yield a sufficiently accurate registration of the load accounting for the ambient temperature. Thus, the temperature of the bimetallic strip must be equal to the temperature of the transformer winding. In practice, however, the use of such bimetallic strips is extremely difficult for the following reasons:

(a) Bimetallic strips display a high spread of bending moments caused by their physical and chemical properties;

(b) A bimetallic strip deflects in accordance with the square of the amount of the heating current, whereas the excess of the winding temperature over the oil temperature reflects an exponential dependence with indices 1.7–1.8;

(c) Mechanical connection of the bimetallic strips immersed in the oil and inserted in the circuit with the transformer requires that their characteristics be in agreement;

(d) Minor amounts of deflection in the strips present difficulties in summing large values of temperature gradients and load current; and (e) It is impossible to take into account various levels of overloads, since the device responds only to one predetermined value of a critical overload.

Since transformers of various types and ratings have dissimilar thermal characteristics, heat-sensing bimetallic strips are to be selected for each type of transformer, i.e. individual protection devices are to be designed which is economically disadvantageous.

Another widely used type of device for overload protection of transformers is based on the employment of the so called thermal images.

To determine the temperature of an oil-filled transformer there is immersed in the top portion of the oil a heat-sensing element, such as a bimetallic strip, a heat expansion bulb, a thermal resistor or other suitable element, which is responsive to the heat of a heating element also immersed in oil, for example, a coil which is in the circuit with the current measuring transformer of the power transformer. Thus, the immersed heat sensing element is affected by both the temperature of the oil and also by the amount of current passing through the coil. In measuring systems of such type, the amount of heat given off by the heating coil is an indication of the temperature differential between the transformer and the surrounding the oil. By subjecting the heat-sensing element to both oil temperature and the heating coil temperature proportioned to the current flow through the windings of the transformer, it is possible to simulate the thermal conditions of the transformer windings.

Concerned with the above mentioned systems which are based on the use of thermal images and constructed for overload protection of electric induction apparatus is a device disclosed in the British Pat. No. 1,161,985.

This device is intended for overload protection of electric apparatus having a winding immersed in a dielectric liquid and comprising a heat sensing element placed in the top portion of the dielectric liquid, a correcting means used to account for changes in temperature of the hottest spot of the winding, and a switching circuit. The switching circuit comprises low-overload threshold elements selectively operating at successively increasing temperature values of the hottest spot of the winding, a high overload threshold element whose output signal corresponds to the critical temperature of the hottest spot of the winding, alarm circuits responsive to signals of the low-overload threshold elements, and a tripping circuit responsive to signals of the high overload threshold elements.

The protection circuit is based on a thermal image simulating the heating of the electric apparatus winding, a power transformer in this case. The signal which is a function of the winding temperature is received by the switching circuit from the heat sensing element, the signal being corrected with due account to the temperature gradient between the hottest spot of the winding and the temperature of the top portion of the oil. To allow for the temperature gradient between the hottest spot of the winding and the oil temperature, the correcting means is in circuit with a heating element of a heat sink which serves as a thermal image. As the temperature increases to a value indicating a safe overload of the transformer, the control signal comes through the respective threshold element to the alarm circuit, thus initiating on the display panel a signal indicating a certain value of overload. If the control signal exceeds the threshold setting indicating a dangerous overload, the load is switched off.

On the whole the described device solves the problem of overload protection of electric apparatus, however realisation of devices based on the principle of the use of thermal images encounters difficulties. The difficulties are associated with the fact that in a physical simulation of thermal conditions of a transformer a number of variables should be taken into account and, since the variables can not be obtained continuously with a sufficient degree of confidence, the operation of the known protection circuits is not noted for a high degree of accuracy or reliability. Accuracy of operation of thermal images is dependent on such factors as composition of the dielectric liquid used for transformer cooling, characteristics of the winding and of the insulating material, outside air temperature, size and rating of the transformer and many others. Besides, such factors as changes in oil viscosity disturbing the heat exchange and the thermal inertia of the windings impair the accuracy of the indication of the winding hottest spot, thereby causing faulty operation of the alarm system.

SUMMARY OF THE INVENTION

It is, therefore, a main object of this invention to provide a simpler and a more reliable device for overload protection of an electric induction apparatus immersed in a dielectric liquid. This device ensures a more accurate simulation of the dependence of temperature of the winding hottest spot upon diverse operating conditions and prevents failures and false operations.

It is a further object of this invention to provide a device for overload protection of an oil-filled transformer. This device responds to the oil temperature and load current and comprehensively accounts for changes in the winding temperature caused by various factors.

Another object of this invention is to provide a device for overload protection of an oil-filled transformer, which responds to changes in excess of the winding temperature over oil temperature, these changes being a function of the load current factor.

A further object of this invention is to provide a device for overload protection of a power transformer, which has a higher selectivity response of individual elements of the switching circuit.

Still another important feature of the present invention is to provide a device for overload protection of an oil-filled transformer, which has a higher selectivity of response of individual elements of the switching circuit.

It is a further object of this invention to provide a device for overload protection of an oil-filled transformer, which has an arrangement which eliminates erroneous trippings caused by current overloads at a time when the oil temperature has not yet reached a critical level.

An additional object of this invention is to provide a device for overload protection of an oil-filled transformer, which comprises a means for the prevention of a breakdown caused by wear of the winding insulation.

It is a further object of this invention to provide a device for overload protection of an oil-filled transformer, in which the information about the load current and the oil temperature are used for determining the safe service life of the transformer.

The objects of the present invention are attained by a device for overload protection of electric apparatus which has a winding immersed in a dielectric liquid. The device comprises a heat-sensing element placed in a top portion of the dielectric liquid, a correcting means used to account for changes in temperature of the hottest spot of the winding due to the load current, and a switching circuit. The switching circuit includes low overload threshold elements selectively operating at successively increasing temperature values of the hottest spot of the winding, a high-overload threshold element, whose output signal corresponds to the critical temperature of the hottest spot of the winding, alarm circuits responsive to the signals of the low overload threshold elements, and a tripping circuit responsive to the signals of the high overload threshold element. The correcting means has a load current sensor and a function generator and generates a signal indicating overheating of the winding with respect to the dielectric liquid temperature, which is supplied together with the output signal of the heat sensing element to the threshold elements of the switching circuit. The tripping circuit is electrically connected with the low overload threshold elements for a selective output of control signals.

The switching circuit should be preferably constructed so that the heat sensing element and the load current sensor are connected in series through the threshold elements. The threshold elements are connected to an OR-circuit and by way of a reference voltage divider coupled to the alarm circuits and the tripping circuit. The alarm circuits and the tripping circuit have a time relay with an independent setting. The tripping circuit is provided with an interlocking circuit for retaining false switching off signals. The interlocking circuit has a one-shot multivibrator responsive to the low overload threshold element, an AND-circuit whose inputs are connected to the one-shot multivibrator and the threshold element of high overload a time relay, whose setting is higher than the setting of the respective relays in the alarm and tripping circuits, connected to the output of the AND gate, and a NOT circuit responsive to the output signal of the AND circuit and placed between the threshold element of the high overload and the time relay connected to this threshold element.

An important advantage of this invention is the provision of tripping the electric apparatus or signalling the overload conditions in accordance with the most specific parameter, i.e. temperature of the winding hottest spot, more accurately and in a simpler way, as far as the physical realization of the apparatus is concerned.

The interlocking circuit for retaining false switching off signals makes it possible to account for thermal inertia of the electric apparatus structural components and to prevent false alarms in the case of safe current overloads.

The function generator enhances the accuracy of approximation of temperature dependence on the load current flowing in the electric apparatus winding and substantially simplifies the physical realization of the correcting device.

BRIEF DESCRIPTION OF THE DRAWINGS

Other objects and advantages of this invention will best be understood from the consideration of the following detailed description with the accompanying drawings, in which:

FIG. 3 is a circuit diagram of an embodiment of the circuit of connection of a heat sensing element and the function generator with threshold elements of a switching circuit, according to the invention;

FIG. 4 is a block diagram of an embodiment of a tripping circuit block-diagram, according to the invention;

DETAILED DESCRIPTION OF THE INVENTION

Figure 1:
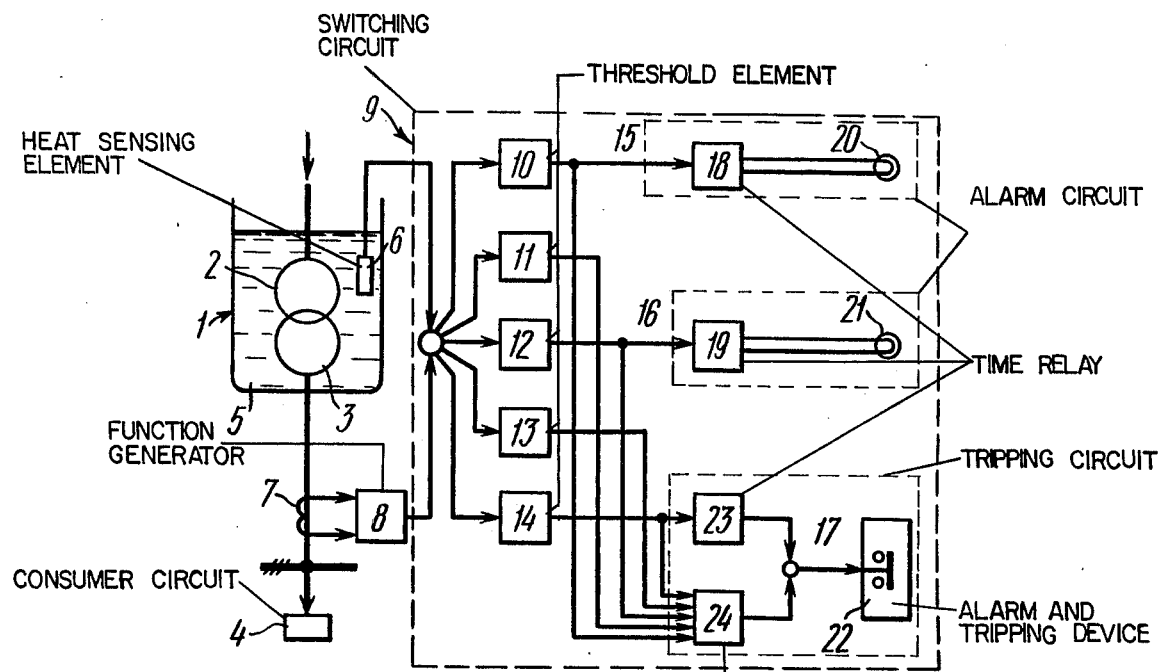
FIG. 1 is a block-diagram of a device for overload protection of electrical apparatus, according to the invention.

An embodiment of the present invention as used for protection of a power transformer will be given below for the sake of illustration purposes only.

A power transformer 1 (FIG. 1) has a primary winding 2 and secondary winding 3 connected to the consumer circuit 4. Both windings are immersed in oil 5 or in any other cooling dielectric liquid.

In accordance with the known relationship described in the book by L. M. Shnitser Nagruzochnaya sposobnost silovykh transformatorov, Gosenergoizdat, Moskva, 1953, the temperature of the hottest spot of the windings 2 and 3 of the transformer 1 is the most significant parameter for the estimation of the degree of danger of transformer overloading and can be found from the equation $$\theta = \theta_1 + \theta_2 \quad (1)$$

in which $\theta$ = temperature of the hottest spot of the winding
$\theta_1$ = temperature of cooling oil 5 which is dependent on outside air temperature, heating of the winding and cooling conditions (as, for example, wind, etc.); and
$\theta_2$ = difference between the temperature of the hottest spot of the winding due to load current over the cooling liquid temperature ($\theta_1$).

In line with the above relationship, the device for transformer overload protection, according to the invention, has two sensors - a heat sensing element 6 and a load current sensor 7 - which will be described in further detail.

The heat sensing element 6 is placed in a top portion of oil 5 of the transformer 1.

Component $\theta_2$ in equation (1) is related to the transformer load current by the following relationship:

$$\theta_2 = \beta \tau k^n \quad (2)$$

in which:

$\beta$ = coefficient accounting for the difference in temperatures between the hottest spots of the windings 2 and 3 of the transformer 1;
$\tau$ = stabilized average overheating of the winding as compared with oil under nominal conditions;
$k$ = ratio of the actual transformer load current to the nominal one (overload ratio);
$n$ = coefficient dependent on the design of the transformer 1 and the properties of the cooling oil 5.

To convert the current into a voltage proportional to the difference between the temperature of the hottest spot of the winding due to load current and the oil temperature ($\theta_2$), the load current sensor 7 is connected to a function generator 8 adapted to determine the above relationship (2).

The load current sensor 7 together with the function generator 8 make up a correcting means which accounts for the change in the hottest spot of the winding due to the load current.

A switching circuit 9 of the transformer protection device comprises threshold elements 10, 11, 12, 13 and 14 connected with the heat sensing element 6 and the function generator 8, alarm circuits 15 and 16 and a tripping circuit 17.

The output signals of the threshold elements 10–14 correspond to a number of successively increasing temperature values of the hottest spot of the winding (for example, 130°, 135°, 140°, 145° and 150° C.), the threshold elements 10, 11, 12 and 13 corresponding to the low, and 14 to the high, overload of the transformer.

Low-overload threshold elements 10 and 12 are respectively connected to alarm circuits 15 and 16 which respectively comprise time relays 18 and 19 and alarms 20 and 21.

The setting time relays 18 and 19 is different and depends on the intensity of the output signals of the threshold elements 10 and 12. Specifically, since the low overload signal at the input of the relay 19 characterizes a higher and, hence, a more dangerous temperature of the hottest spot of the winding, the time delay in that relay is less than in relay 18.

Light or audio signaling devices, for example, signal lamps or indicating relays may be used as the alarms 20 and 21.

To additionally cool the transformer 1 the alarm 21 at the output of circuit 16 may be replaced by a fan switch.

If a more fractional grading of alarm signals is required, similar circuits can be connected to other threshold elements, the number of additional threshold elements being unlimited.

Connected to the threshold element 14, whose high overload signal corresponds to the critical temperature of the hottest spot of the winding at which damage to the insulation and, hence, breakdown of the transformer 1 arises (for example, 150° C.), is a tripping circuit 17 with an alarm-and-tripping device 22 at the output adapted to unload the transformer 1 by deenergizing it or by automatically switching off some of the consumers 4. The alarm-and-tripping device 22 is operatively connected to the threshold element 14 by a time relay 23 and to the threshold elements 10-13 by unit 24 which will be explained in further detail.

In the device being described, a heat sensing element such as a thermister with an operational DC amplifier at the output, may be used as the temperature heat sensing element 6. Other appropriate devices, such as a multi-contact thermometer, etc. can also be used as the heat sensing element.

The load current sensor 7 is a measuring current transformer (FIGS. 1 and 2) connected to the secondary winding 3 of transformer 1.

Figure 2:
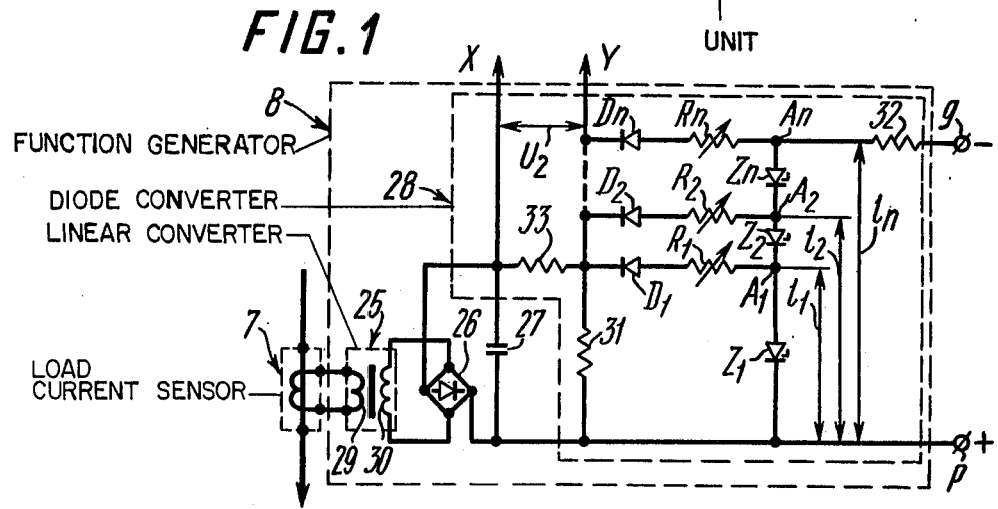
FIG. 2 is a circuit diagram of an embodiment of a load current sensor and of a function generator, according to the invention.

As is shown in FIG. 2, the function generator 8 comprises a linear converter 25 for convertion of the measuring transformer current into a corresponding voltage, a rectifier bridge 26, connected to linear converter 25, a capacitor 27 for smoothing out the rectified voltage pulsations and a diode converter 28 for conversion of the rectified voltage at the output of the capacitor 27 into output voltage $U_2$ at outputs X and Y, in accordance with the equation (2).

Linear converter 25 has a primary winding 29 connected to the circuit of the load current sensor 7 and a secondary winding 30 connected to the rectifier bridge 26. The smoothing capacitor 27 is connected to the rectifier 26 on the rectified voltage side.

The diode converter 28 comprises a voltage divider (zener diodes $Z_1, Z_2 \ldots Z_n$) with outputs $A_1, A_2 \ldots A_n$, to which are connected circuits consisting of resistors $R_1, R_2 \ldots R_n$ and diodes $D_1, D_2 \ldots D_n$.

The negative outputs Y of diodes $D_1-D_n$ are connected by a resistor 31 to the positive terminal P of a supply circuit. A resistor 32 at the input of the divider, connected with the negative terminal Q, limits the current in the zener diodes. The output of the rectifier bridge 26 is connected with the negative leads Y of the diodes $D_1-D_n$ by a resistor 33.

The function generator illustrated in FIG. 2 is the preferable embodiment though it may be replaced by any known function generator of, for example, the relay contact type.

Threshold elements 10-14 (FIG. 3) representing known sensitive null indicators, which may be integral circuits, have their inputs interconnected by isolating diodes 34, 35, 36, 37 and 38 to ensure selectivity of operation. The outputs of the threshold elements 10-14 are respectively connected to outputs 39, 40, 41, 42, 43 of a reference voltage divider 44 (made either of resistors or zener diodes). The supply circuit of the divider 44 is represented in the drawing by the positive terminal P and the negative terminal Q.

The positive leads of isolating diodes 34-38 are connected to the lead of resistor 33. This register 33 is connection in series with the resistor 45. The resistor 33 is connected to the output of the function generator 8 (FIG. 2) and the resistor 45 is connected to the output of heat sensing element 6. Due to such an arrangement, heat voltage $U_1$ of heat sensing element 6 and heat voltage $U_2$ of the function generator 8 are summed at the input of the switching circuit 9 (FIG. 1), the voltage $U_1$ being proportional to the temperature ($\theta_1$, equation 1) in the top portion of oil 5 and the voltage $U_2$ being a function of the difference between the temperature of the winding hottest spot of the wind which is caused by load current and the temperature ($\theta_2$, equations 1 and 2) of the oil 5.

Operation of the threshold element 10 (FIG. 3) is dependent on the difference between the input voltage $U_3 = U_1 + U_2$ and the reference voltage $E_1$ across the power supply negative terminal Q and lead 39 of voltage divider 44.

Similarly, operation of each of the threshold elements 11-14 is dependent on the difference between the respective input voltage $U_3$ and the respective voltages $E_2, E_3 \ldots E_5$ of the divider 44.

As is seen in the diagram of the tripping circuit 17 of FIG. 4, unit 24 comprises an interlocking circuit 46 for retaining false switching off signals and a supply circuit 47 for the supply of an alarm signal or for the deenergization of the electric apparatus upon the complition of the safe life of said apparatus.

The circuit 46, which is adapted to prevent false operation of the alarm-and-tripping device 22, comprises a one-shot multivibrator 48 intended for shaping a short-time pulse from the signal of low overload threshold element 10, a logical AND circuit 49 having one input connected to the one-shot multivibrator 48 and another input connected to the threshold element 14, and a time relay 50 which is coupled to the output of the AND circuit 49 and is operatively coupled to the alarm-and-tripping device 22.

To prevent operation of the time relay 23, which has a smaller time delay than relay 50, a NOT circuit 51 electrically connected with AND circuit 49 is inserted between the threshold element 14 and the time relay 23.

The circuit 47 of unit 24, which is adapted to prevent the failure of the transformer 1 due to damage of the insulation of the winding 3 upon elapse of the safe life of the transformer, comprises a converter 52 for conversion of signals, corresponding to the temperature of the hottest spot of the winding, into a number of pulses, corresponding to the exponential law of aging of the winding insulation, and a counter 53 which integrates in time the output of signals of the converter 52 for monitoring the safe life of the transformer 1 and for feeding a control signal to the alarm-and-tripping device 22 at the instant the safe life period elapses.

Figure 5:
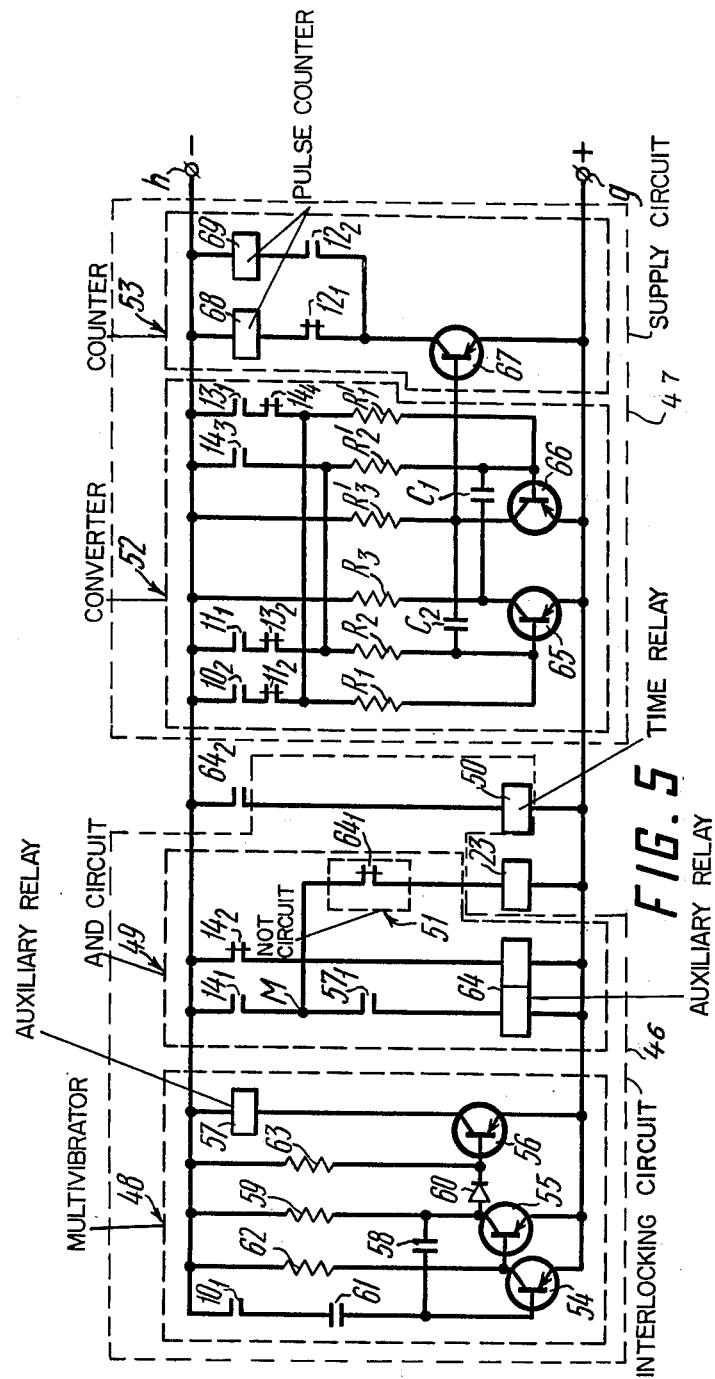
FIG. 5 is a schematic diagram of an embodiment of a interlocking circuit and a supply circuit, according to the invention.

A more detailed description of the elements of the interlocking circuit 46 and the supply circuit 47 is given in FIG. 5.

The one-shot multivibrator 48 incorporates transistors 54, 55, 56 with an auxiliary relay 57 inserted into the collector circuit of transistor 56.

The RC network with a capacitor 58 and a resistor 59 is adapted to determine the duration of the output pulse of the one-shot multivibrator 48 and a limiting diode 60 is adapted to stabilize the operation of the multivibrator.

Capacitor 61 is connected with the negative terminal "h" of the power supply circuit by output contact $10_1$ of the respective threshold element 10, the other lead of the capacitor 61 being connected to the base of the transistor 54.

The collector circuits of transistors 54 and 55 incorporate resistors 62 and 59, respectively. Resistor 63 is connected to the base circuit of transistor 56.

The AND circuit 49 incorporates two series connected normally open contacts and the first winding of a two-position relay 64, contact $14_1$ being the output contact of the respective threshold element 14 and contact $57_1$ being the contact of the respective relay at the output of the one-shot multivibrator 48. The other winding of relay 64 is connected to the supply circuit through normally-closed contact $14_2$ of the respective threshold element 14 and is adapted to reset this relay 64 in its original position.

The time relay 23 is connected to point M through normally closed contact $64_1$ of the respective relay 64, the contact functioning as the NOT circuit 51.

The time relay 50 is connected to the supply circuits through the normally-open contact $64_2$ of the respective relay 64.

As is seen from the circuit illustrated in FIG. 5, converter 52 is a symmetrical multivibrator, incorporating transistors 65 and 66 which have in their base-collector circuits resistors $R_1$, $R_1'$, $R_2$, $R_2'$ and capacitors $C_1$ and $C_2$ forming RC-time-setting networks which determine the multivibrator's switching frequency.

These RC-networks are connected to the negative terminal h of the supply circuit by the output normally-open contacts $10_2$, $11_1$, $13_1$ and $14_3$ and the normally-closed contacts $11_2$, $13_2$ and $14_4$ of the respective threshold elements 10–14.

The collector circuits of transistors 65 and 66 are fitted with resistors $R_3$ and $R'_3$ respectively.

Change-over contacts $12_1$ and $12_2$ of the respective threshold element 12 are fitted in the collector circuit of a transistor 67 for the connection of pulse counters 68 and 69. These elements together make up the counter 53 integrating in time the output signals of the converter for determining the instant of the completion of the transformer safe life. As was already indicated, counter 53 is operatively connected with the alarm-and-tripping device 22 (FIG. 4).

The device operates in the following way.

The heat sensing element 6 placed at the top of oil the 5 (FIG. 1) picks up the oil temperature which is due to the load current and transformer cooling conditions.

Figure 6A:
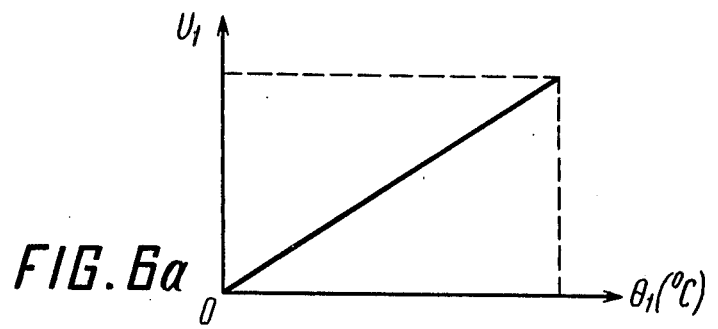
FIG. 6a is a graph showing the dependence of the voltage at the heat sensing element output on the temperature at a top portion of a dielectric liquid.

Voltage $U_1$ at the output of the heat-sensing element 6 is proportional to said oil temperature ($\theta_1$, equation 1), as is apparent from the graph of FIG. 6a.

At the secondary winding 3 connected to the load current sensor 7 a simultaneous current flow in the sensor 7 which is proportional to the load current in the secondary winding 3 of a transformer 1, arises. This current is applied to the primary winding 29 of the linear converter 25 at the input of the function generator 8 (FIG. 2). Simultaneously, voltage proportional to the current in the primary winding 29 arises in the secondary winding 30 of the linear converter 25. The voltage is applied to the rectifier bridge 26 and rectified, and transmitted to the input of a diode converter 28 by a smoothing capacitor 27.

Figure 6B:
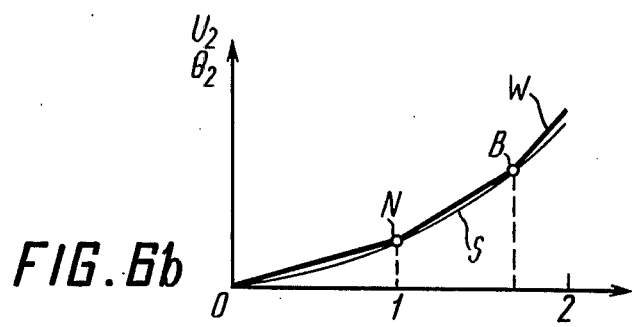
FIG. 6b is a graph showing the dependence of the voltage at the output of the function generator on the load current.

Operation of the diode converter 28 can be demonstrated with the aid of the graph of FIG. 6b. Curve S of graph is plotted in accordance with the equation (2) and represents changes in $\theta_2$ in dependence on the load current. The line W corresponds to changes in voltage $U_2$ at the output of the function generator 8 in dependence on the same parameter.

In the absence of current in the circuit of the function generator 8 (FIG. 2), diodes $D_1$–$D_n$ are disabled and current does not flow through resistors $R_1$–$R_n$.

When voltage appears across the capacitor 27, current starts to flow through resistors 33 and 31 thereby causing a drop of the voltage $U_2$ across the resistor 33, the voltage increasing in conformity with the linear law represented by segment ON of the line W in FIG. 6b. When voltage across the resistor 31 reaches a value exceeding the voltage $e_1$ across the positive terminal p and lead $A_1$ of the zener diode $Z_1$, diode $D_1$ becomes conductive and current starts to flow through resistor $R_1$ thereby causing an additional drop of voltage across the resistor 33. The instant the diode $D_1$ becomes conductive corresponds to the salient point in the diagram of the current converter output voltage as shown at N of the line W (in FIG. 6b).

With an increase of voltage across the resistor 31 to a magnitude exceeding the voltage $e_2$ across the positive terminal p and lead $A_2$ of the zener diode $Z_2$ diode $D_2$ becomes conductive and current starts to flow through resistor $R_2$. The instant $D_2$ becomes conductive the diode corresponds to the salient point B of the line W in the graph of FIG. 6b.

The other elements of the circuit of the diode converter 28 function in a similar manner. Adjustment of the values of the resistances $R_1$–$R_n$ and the transformation ratio of the linear converter 25 makes it possible to carry out a linear-step approximation of the prescribed function curve (equation 2). It is to be understood that the greater the number of leads $A_n$ and their respective elements $Z_n$, $D_n$ and $R_n$ in the circuit of the diode converter 28, the more accurate the approximation.

Voltages $U_1$ of the heat-sensing element 6 and $U_2$ of the function generator 8 are summed up in series connected resistors 45 and 33 (FIG. 3) fitted at the output of the heat sensing element 6 and the function generator 8, respectively. The total voltage $U_3 = U_1 + U_2$ is applied to the input of the switching circuit 9. If voltage $U_3$ is greater than $E_1$, diode 34 is triggered and pickup voltage is supplied to the input of the threshold element 10. Voltage $E_1$ of a divider 44 is selected so as to correspond to a preset value (for instance 40° C.) of the amount of temperature in excess of the nominal temperature of the hottest spot of the winding. The signal of the threshold element 10 is applied to an alarm 20 through the time relay 18 of the alarm circuit 15 (FIG. 1).

The alarm 20 at the output of the circuit 15 serves to inform the operator of the fact that the temperature of the hottest spot of the winding is beyond the nominal point (130° C.) in this case).

When the total voltage $U_3$ exceeds the reference voltage $E_2$ of the divider 44, it triggers diode 35 thereby causing the operation of the threshold element 11 (FIG. 3) whose low overload signal is, in this case, 135° C. The signal of the threshold element 11 is supplied to the input of the converter 52 (FIG. 4) of the tripping circuit 17 which will be discussed below.

With a further increase in the winding temperature (for example to 140° C.) the total voltage $U_3$ will rise to a value exceeding the reference voltage $E_3$ of the divider 44 (FIG. 3), thereby triggering diode 36 which causes the threshold element 12 to operate and by a relay 19 (FIG. 1), having a smaller time delay than the relay 18, the threshold element switches on the other alarm 21 thus warning the operator about a critical overload of the transformer 1. As has already been said, instead of the alarm signal, a control signal can be supplied at the output of circuit 16 for activating the transformer cooling fan (not shown) which will reduce the temperature of the hottest spot of the winding.

Similarly, to the signal of the threshold element 11, a signal of the low overload threshold element 13 (in this case equal to 145° C.) is supplied to the input of the functional converter 52.

Upon reaching the critical temperature of the hottest spot of the winding (for example, 150° C.) which complies with the condition $U_3 > E_5$, the high-overload threshold element 14 operates as described above and its signal arrives at the input of the tripping circuit 17

(FIG. 1) the operation thereof being dependent on the occurrence of the following three cases.

First case: load current of the winding 3 of the transformer 1 gradually increases.

In this case the signal of the threshold element 14 triggers the time relay 23 (FIGS. 1 and 4), whose setting is less than that of the relay 19. The output signal of the relay 23 actuates the alarm-and-tripping device 22 which automatically disconnects some of the consumers 4.

It should be noted that relays 18, 19 and 23 together with their starting threshold elements 10, 12 and 14 can be replaced by one relay with the setting dependent on the input signal, the relay having three outputs connected to the indicators and the alarm-and-tripping device.

Second case: transformer load changes abruptly.

In case of short-time abrupt current overloads a high overload signal arises at the input of the tripping control circuit 17. However, actual overheating will not reach a critical value due to the thermal inertia of the winding (its overheating Δ t stabilizes in 15–20 minutes).

A sharp increase in a total voltage U$_3$ arising in this case and corresponding to overloads at a stabilized temperature of the winding may cause operation of the threshold element 14 whose signal, if passed, as in the previous case, through relay 23 with a time delay less than Δ t, would cause an unwarranted disconnection of some of the consumers 4. To prevent such false operation the unit 24 in the tripping circuit 17 (FIG. 4) has an interlocking circuit 46 for retaining false switching off signals with a relay 50 whose time delay is greater than that of the relay 23. The circuit 46 filters out high overload signals due to the load current.

The selective function of the circuit 46 is based on the fact that the above-described abrupt changes in the load current cause a simultaneous operation of all the threshold elements, whereas in the case of a gradual overheating of the winding the threshold elements operate one by one at time intervals dependent on the speed of load changes.

Upon operation of the threshold 10 its signal is applied to the input of the one-shot multivibrator 48 wherein it is converted into a momentary current pulse which is supplied to one of the inputs of the AND circuit 49.

If a high overload pulse from the threshold element 14 is applied simultaneously with the momentary current pulse to the second input of the circuit 49, there arises a signal at the output of the AND circuit 49, the signal triggering the relay 50 with the increased time delay.

To prevent a leading operation of the relay 23, a signal is applied from the output of the AND circuit 49 to the input of a NOT circuit 51 which interlocks operation of the relay 23.

Thus, in the presence of a current bump the alarm-and-tripping device 22 is switched off by the output signal of the time relay 50, i.e. only when such overload entails overheating of the winding up to a critical level for a period stipulated by the setting of the relay.

In case of a gradual increase of the load, the threshold element 10 upon operation triggers the one-shot multivibrator 48. However, the signal applied from the threshold element to the input of the AND circuit 49 does not coincide in time with the signal applied to the other input of the same circuit from the threshold element 14 and, as a result, no signal appears at the output of the AND circuit 49. In such case, as has already been stated above, the relay 23 is started and its output signal causes operation of the alarm-and-tripping circuit 22.

In more detail the operation of the interlocking circuit 46 for retaining false switching off signals can be followed from the diagram represented in FIG. 5.

Upon operation of the threshold element 10 its normally open contact 10, connected to the input of one-shot multivibrator 48 closes, thus causing a momentary triggering of transistor 54, which causes the base of transistor 55 connected to the collector of transistor 54 to acquire a positive potential, and the normally open transistor 55 closes.

The disabled state period of transistor 55 is determined by the time constant of the RC network consisting of capacitor 58 and resistor 59. During this period diode 60 will be disabled, thereby enabling transistor 56 by way of emitter-base-resistor 63 and forcing relay 57 to operate in the collector circuit of transistor 56.

Thus, the contacts of the auxiliary relay 57 in the AND circuit 49 remain closed during the period determined by the time constant of the RC circuit of the single-shot multivibrator 48. Capacitor 61 in the trigger circuit of the single-shot multivibrator 48 ensures single action of the multivibrator upon closure of contact 10$_1$ of the respective threshold element 10.

In case of a sudden change in the current, the normally-open contact 14$_1$ of the respective threshold element 14 of the AND circuit 49 closes simultaneously with threshold element 10, thereby forming a circuit for switching on auxiliary relay 64 whose output contact 64$_2$ switches on the winding of time relay 50.

In case of a gradual increase of the load, relay 57 of the single-shot multivibrator 48 is able to open by the time of closure of the contact 14$_1$ of the AND circuit 49 of the respective threshold element 14, so that relay 64 and the time relay 50 connected thereto do not operate, and in such case some of the consumers 4 are disconnected by the following circuit: contact 14$_1$, normally-closed contact of 64$_1$ and time relay 23.

The normally-closed contact of 64$_1$ functions as the NOT circuit 51 and interlocks relay 23 upon operation of the AND circuit 49 which is stipulated by the already mentioned difference in the time delay of relays 23 and 50.

The two-position relay 64 is reset by the following circuit: normally-closed contact 14$_2$ and a second winding of the relay 64.

Third case: due to prolonged operation of the transformer wear of the insulation of its windings approaches a preset level and further operation of the transformer entails the hazard of breakdown.

The instant of complete wear of the insulation can be determined with the aid of a counter 53 (FIG. 4) which receives signals from the converter 52. The converter 52 converts signals received from the sensing elements 6 and 7 through the threshold elements 10–14 into signals proportional the instantaneous value of aging of the insulation in accordance with the principle expressed by Montzinger's equation.

$$L = L_o e^{-a\theta} \qquad (3)$$

described in the book by L. M. Shnitser "Nagruzochnaya sposobnost silovykh transformatorov", Moskva, 1953 in which:

L = actual service life of the insulation;

$L_o$ = insulation service life at a constant temperature considered as the standard one which corresponds to to the transformer nominal safe life $\theta$ = temperature of the hottest spot of the winding found from equation (1); and a = coefficient accounting for changes in the insulation service life due to changes in the temperature of the hottest spot of the winding, coefficient being dependent on the physical properties of the insulation material.

In accordance with data prepared by the International Electrotechnical Commission (see International Electrotechnical Commission, Technical Committee No. 0.74: Power Transformers Draft Loading Guide for Oil-immersed Transformers, November, 1965), the service life of the winding is doubled or reduced by one half for each 6° C. change in its temperature with respect to the normal temperature.

Figure 6C:
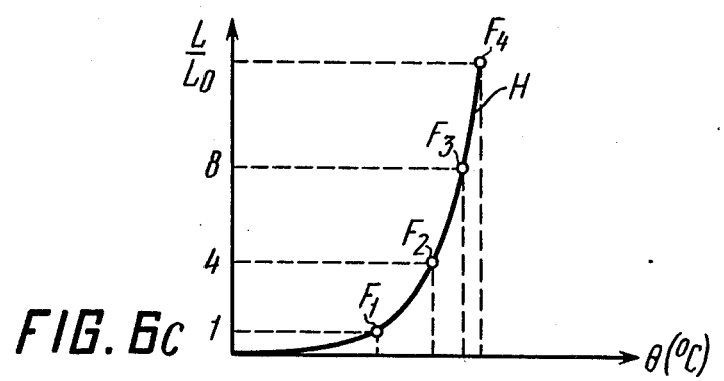
FIG. 6c is a graph showing the dependence of the safe life of the electrical apparatus on the temperature of the hottest spot of the winding.

Operation of the converter 52 and counter 53 can be understood from the graph of FIG. 6c showing the dependence of the safe life of the electric apparatus on the temperature of the hottest spot of the winding.

Exponential curve H of the graph indicates a relative safe life L of the transformer varying with the temperature of the hottest spot of the winding, and is plotted in accordance with the equation (3).

Upon operation of the threshold element 10 its normally-open contact $10_2$ (FIG. 5) closes, and voltage is applied with the aid of the contact through the normally closed contact $11_2$ to the time-setting circuits $R_1-C_2$ ($R'_1-C_1$) of the converter 52 which is made as a symmetrical multivibrator.

The transistor (for example 65) at this instant is conducting, thus corresponding to a fixed disabled state of the transistor 66 within circuit $C_1-R'_1$ until the moment when the voltage at the capacitor $C_1$ exceeds the level of enabling within the circuit including emitter-base of the transistor 66 and resistor $R'_1$. At this moment the transistor 66 starts to conduct and capacitor $C_2$ connected to the collector circuit of transistor 66, appears connected to the positive power supply terminal by the emitter-collector circuit of the disabled transistor 66. The base of the transistor 65 in this case is under the effect of the disabling voltage of capacitor $C_2$ which retains the transistor in a disabled state until the capacitor $C_2$ is discharged by the resistor $R_2$ and then charged to a level enabling operation of the transistor 65.

The frequency of switching the converter 52 in the above succession is determined by the time constants of the circuits $R_1-C_2$ ($R'_1-C_1$) and $R_2-C_2$ ($R'_2-C_1$), and amounts to, for instance, two pulses per minute which corresponds to the instantaneous value of winding wear found from the ordinate of point $F_1$ of the diagram of FIG. 6c. A pulse counter 68 connected to the collector circuit of the transistor 67 by the normally-closed contact $12_1$ indicates the amount of wear of the transformer winding insulation, the amount being proportional to the number of pulses per time period during which the temperature of the hottest spot of the winding corresponded to the abscissa of point $F_1$.

Upon operation of the threshold element 11 its normally-open contact $11_1$ closes, and the normally-closed contact $11_2$ opens and disconnects the circuit for actuating the converter 52 from the respective threshold element 11. In this case power is supplied through the normally-closed contact $13_2$ of the threshold element 13 and the normally-open contact $11_1$ to the time-setting circuits $R_2-C_2$ and then to $R'_2-C_1$ which establishes another and higher frequency of the multivibrator, for example, four pulses per minute which corresponds to the instantaneous value of winding wear found from the ordinate of point $F_2$ of the diagram of FIG. 6c.

Operation of the threshold element 12 leads to the opening of its normally-closed contact $12_1$ in the circuit of the pulse counter 68, and closing of the normally-open contact $12_2$ in the circuit of a pulse counter 69, due to which the first of the counters 68 becomes disconnected and the second 69 becomes connected.

Upon operation of the threshold element 13 its normally-open contact $13_1$ closes and the normally-closed contact $13_2$ of the respective threshold element 13 opens. Supply voltage is fed to the time-setting circuits $R_1-C_2$ ($R'_1-C_1$) thereby establishing the same frequency of switching of the multivibrator as did the operation of the threshold element 10 (two pulses per minute in this case).

Similarly, upon operation of the threshold element 14 the converter 52 is triggered by the circuits $R_2-C_2$ ($R'_2-C_1$) thus interlocking the circuit of the contact $13_1$. The frequency of switching of the multivibrator is equal to the frequency of the operation of the threshold element 11. The output signals of the converter 52 in the latter two cases are applied to the counter 69. To record the wear corresponding to the ordinates of points $F_3$ and $F_4$ of curve H in FIG. 6c the counter readings should be multiplied by the scale factor found from the relationship of the respective coordinates ($F_3 F_1$ and $F_4 F_2$).

The counter 69 similarly to the counter 68 integrates in time the instantaneous values of the output voltages of the converter 52 within the period in which the temperature of the winding hottest spot corresponded to the setting of the respective element.

Though the diagram of FIG. 5 represents two counters 68 and 69 and a converter 52 connected with four threshold elements (10, 11, 13, 14), the number of counters and threshold elements is not limited and depends on the preset accuracy for determining the safe life of the transformer. It is to be understood that the accuracy of indications increases with the increase in the number of counters and threshold elements.

The measurements of the safe life by means of several counters with different scale factors will enable the curve H of the graph in FIG. 6c to be reproduced with high accuracy for a wide range of temperatures $\theta$.

It should be also noted that among the threshold elements which trigger the converter 52, there may be such which operate at a temperature lower than that required for actuating the threshold element 10.

Due to the long duration of operation of the counter 53 which usually amounts to hundreds of thousands of hours, an overflow may occur. To prevent such overflows the counter is supplemented with a program unit (not shown) which enables the counter to function intermittently for short periods, for example, one minute per each half hour or each hour.

The counter 53 has an output circuit connected with the alarm-and-tripping 22 which device deenergizes the transformer or produces a light or an audible signal upon reaching a preset wear level, for example, when rated service life of the transformer amounts to 150,000 hrs.

The device, according to the present invention, will enable the installation of less powerful transformers due to a more complete utilization of their overload capacity in operation, and also will increase their reliability.

It should be understood that the names of the parts and the numbers given in the description and drawings are for illustration only with respect to the described embodiment of the invention, and should not be used for narrowing the scope of the invention.

Since the description discloses the preferred embodiment of the invention, it is obvious, that modifications may be introduced into specific details of construction of the elements described and illustrated in the drawings, without departing from the spirit and scope of the invention, as set forth in the following claims.

What is claimed is:

1. A device for overload protection of an electric apparatus having a winding immersed in a dielectric liquid, comprising:
   a heat sensing element immersed in a top portion of said dielectric liquid and producing electric signals corresponding to the temperature of the liquid;
   a load current sensor electrically connected to said winding of the apparatus;
   a function generator electrically connected to said load current sensor and producing signals indicating overheating of said winding of the apparatus with respect to the temperature of said dielectric liquid, said signals being corrected with due account to changes in the temperature of the hottest spot of said winding caused by the load current;
   a switching circuit comprising: low-overload threshold elements which receive signals from said heat sensing element and from said function generator and selectively operate at successively increasing temperature values of the hottest spot of the said winding;
   a high-overload threshold element receiving signals from said heat sensing element and said function generator and producing signals corresponding to the critical temperature of the hottest spot of said winding; alarm circuits responsive to the signals of said low-overload threshold elements; and
   a tripping circuit responsive to the signals of said high-overload threshold element and said low-overload threshold element and providing a selective supply of control signals.

2. A device according to claim 1, wherein said tripping circuit comprises an interlocking circuit for retaining false switching off signals controlled simultaneously by said low- and high-overload threshold elements respectively.

3. A device according to claim 1, wherein said heat sensing element and said function generator are connected in series and have a common output for giving signals to said threshold elements.

4. A device according to claim 1, wherein said tripping circuit comprises a supply circuit for supply of signals or for deenergizing the apparatus upon termination of its safe life, the supply circuit being responsive to said low- and high-overload threshold elements respectively.

5. A device according to claim 4, wherein said supply circuit comprises a converter, which converts signals corresponding to the temperature of the hottest spot of said winding into the number of pulses corresponding to the principle of aging of said winding insulation, connected with said low- and high-overload threshold elements respectively, and a counter integrating in time the output signals of said converter for fault signalling about the wear of the winding insulation of the apparatus.

6. A device according to claim 5, wherein said converter comprises a multivibrator whose frequency is changed by the output signals of said threshold elements in compliance with the principle of aging of the insulation of said winding.

7. A device for overload protection of electric apparatus having a winding immersed in a dielectric liquid, comprising:
   a heat sensing element immersed in a top portion of said dielectric liquid and producing signals corresponding to the temperature of the liquid;
   a load current sensor electrically connected to said winding of the apparatus;
   a function generator electrically connected to said load current sensor and producing signals indicating overheating of said winding of apparatus above the temperature of said dielectric liquid, said signals being corrected with due account to changes in temperature of the hottest spot of said winding caused by the load current; and
   a switching circuit comprising: low-overload threshold elements receiving signals from said heat sensing element and said function generator and selectively operating at successively rising temperature values of the hottest spot of said winding;
   a high-overload threshold element receiving signals from said heat sensing element and said function generator and producing a signal corresponding to the critical temperature of the hottest spot of said winding;
   alarm circuits controlled by signals of said low-overload threshold elements, containing a time relay with an independent setting, and being electrically connected with respective threshold elements; and
   a tripping circuit controlled by signals of said high-overload threshold element and said low-overload threshold elements, said tripping circuit containing a first time relay with an independent setting connected with said high-overload threshold element, and an interlocking circuit for retaining false switching off signals having
   a single-shot multivibrator controlled by one of said low- and high-overload threshold elements respectively,
   an AND circuit receiving signals from said single-shot multivibrator and from said high-overload threshold element,
   a second time relay, with a setting exceeding that of said first time relay, connected with said high-overload threshold element and
   a NOT circuit placed between said high-overload threshold element and said first time relay and controlled by an output signal of said AND circuit.

8. A device for overload protection of an electric apparatus having a winding immersed in a dielectric liquid, comprises:
   a heat sensing element immersed in a top portion of said dielectric liquid and producing electric signals corresponding to the temperature of the liquid;
   a measuring current transformer connected to the winding of the apparatus;
   a linear current-to-voltage converter electrically connected with said measuring current transformer for generating a voltage proportional to the load current;
   a rectifier electrically connected to said linear converter;

a diode converter which, in accordance with the exponential law, converts the rectified voltage into a voltage corresponding to changes in the temperature of the winding caused by the load current;

a switching circuit comprising low-overload threshold elements and a high-overload threshold element connected with said heat sensing element and said diode converter, said threshold elements selectively operating at successively increasing temperature values of the hottest spot of said winding;

alarm circuits controlled by signals of said low-overload threshold elements;

a tripping circuit controlled by signals of said high-overload threshold element and of said low-overload threshold elements and comprising a time relay with an independent setting receiving a signal from said high-overload threshold element for tripping;

an interlocking circuit, for retaining false switching off signals, to pass output signals of high- and low-overload threshold elements respectively when they coincide in time;

a converter converting signals corresponding to the temperature of the hottest spot of said winding into the number of pulses corresponding to the exponential law of said aging of insulation of said winding, said converter being connected with said low- and high-overload threshold elements respectively;

a counter integrating in time the output signals of said converter for fault signalling about the wear and indicating the end of the safe life of the insulation of the winding of the apparatus; and an alarm-and-tripping device operatively connected with said time relay for unloading the apparatus.

* * * * *